US012732538B2

(12) United States Patent
Silva et al.

(10) Patent No.: US 12,732,538 B2
(45) Date of Patent: Sep. 8, 2026

(54) SYSTEMS AND METHODS FOR UTILIZING USER PROFILE DATA TO PROTECT AGAINST PHISHING ATTACKS

(71) Applicant: GEN DIGITAL INC., Tempe, AZ (US)

(72) Inventors: David Luz Silva, Dublin (IE); Johann Roturier, Maynooth (IE); Petros Efstathopoulos, Los Angeles, CA (US); Iskander Sanchez Rola, Antibes (FR); Savino Dambra, Nice (FR); Platon Kotzias, Athens (GR); Leylya Yumer, Antibes (FR)

(73) Assignee: Gen Digital Inc., Tempe, AZ (US)

( * ) Notice: Subject to any disclaimer, the term of this patent is extended or adjusted under 35 U.S.C. 154(b) by 243 days.

(21) Appl. No.: 17/805,648

(22) Filed: Jun. 6, 2022

(65) Prior Publication Data

US 2023/0403298 A1 Dec. 14, 2023

(51) Int. Cl.
*H04L 9/40* (2022.01)

(52) U.S. Cl.
CPC ........ *H04L 63/1483* (2013.01); *H04L 63/102* (2013.01); *H04L 63/1425* (2013.01); *H04L 63/145* (2013.01)

(58) Field of Classification Search
CPC ............... H04L 63/1483; H04L 63/102; H04L 63/1425; H04L 63/145
See application file for complete search history.

(56) References Cited

U.S. PATENT DOCUMENTS

| | | | | |
|---|---|---|---|---|
| 9,621,566 B2 * | 4/2017 | Gupta | H04L 63/1408 |
| 9,712,562 B2 * | 7/2017 | Wang | H04L 67/535 |
| 10,834,128 B1 * | 11/2020 | Rajagopalan | H04L 51/212 |
| 11,003,746 B1 * | 5/2021 | Vashishtha | H04L 63/1408 |
| 11,973,801 B2 * | 4/2024 | Grealish | H04L 63/1425 |
| 2007/0192855 A1 * | 8/2007 | Hulten | H04L 63/1483 707/E17.115 |

(Continued)

OTHER PUBLICATIONS

Machine learning based phishing detection from URLs: Ozgur Koray Sahingoz, Ebubekir Buber, Onder Demir, Banu Diri (Year: 2018).*

(Continued)

*Primary Examiner* — Andrew Suh
(74) *Attorney, Agent, or Firm* — ALG Intellectual Property, LLC

(57) ABSTRACT

The disclosed computer-implemented method for utilizing user profile data to protect against phishing attacks may include (i) detecting a target user profile associated services accessed by a network-based application, (ii) determining identifiers associated with each of the services, (iii) extracting, for each of the identifiers, feature vectors describing exploitable screen elements in the network-based application associated with phishing attacks, (iv) updating, based on the feature vectors, previously extracted feature vectors in a data repository storing additional profiles for other users associated with the services, (v) predicting, utilizing a machine-learning model, phishing attack threats for target profile user based on a similarity with the additional profiles, and (vi) performing a security action that protects against the phishing attack threats. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2015/0264084 | A1* | 9/2015 | Kashyap | H04L 63/1483 726/22 |
| 2019/0014149 | A1* | 1/2019 | Cleveland | H04L 63/1483 |
| 2019/0238571 | A1* | 8/2019 | Adir | H04L 63/1425 |
| 2022/0182410 | A1* | 6/2022 | Tupsamudre | H04L 63/1483 |
| 2022/0210189 | A1* | 6/2022 | Yu | H04L 41/16 |
| 2022/0232015 | A1* | 7/2022 | Kumar | H04L 63/145 |
| 2022/0337625 | A1* | 10/2022 | Singh | H04L 63/1483 |
| 2023/0396637 | A1* | 12/2023 | Hebbagodi | H04L 63/1433 |

OTHER PUBLICATIONS

"PhishTank", URL: https://en.wikipedia.org/wiki/PhishTank, Oct. 4, 2021, 2 pages.
"Phishpedia", URL: https://www.researchgate.net/publication/349684348, A Hybrid Deep Learning Based Approach to Visually Identify Phishing Webpages, Aug. 1, 2021, 19 pages.
"VisualPhishNet", Zero-Day PhishingWebsite Detection by Visual Similarity, Jul. 7, 2020, pp. 1-18.
"Inferring Phishing Intention viaWebpage Appearance and Dynamics", URL: https://www.usenix.org/system/files/sec22fall_liu-ruofan.pdf, A Deep Vision Based Approach, Jan. 1, 2022, 18 pages.
"ORCA", Modern Workplace Blog, Apr. 29, 2020, 31 pages.

* cited by examiner

SYSTEMS AND METHODS FOR UTILIZING USER PROFILE DATA TO PROTECT AGAINST PHISHING ATTACKS

CROSS-REFERENCE TO RELATED APPLICATION

This application claims priority to European patent application no. EP22386030.5, which was filed on May 23, 2022, and titled "SYSTEMS AND METHODS FOR UTILIZING USER PROFILE DATA TO PROTECT AGAINST PHISHING ATTACKS," and the entirety of this application is incorporated herein.

BACKGROUND

Computing device users are increasingly targeted by phishing attacks designed to cause the unintentional leaking of sensitive information, such as login credentials for accessing websites and/or mobile applications, to malicious actors. For example, a phishing attack may include a fraudulent login screen incorporating a facsimile of a banking service company logo to deceive a user into providing their login credentials which may then be utilized by a malicious actor to access the user's account information and/or conduct unauthorized transactions.

Conventional approaches for addressing phishing attacks often focus on detection mechanisms including machine learning (e.g., for differentiating electronic SPAM messages from legitimate e-mail messages) and deny list (i.e., blacklist) based approaches and reference-based approaches (e.g., maintaining a repository of the logo and screenshots of well-known consumer product brands). Other advanced approaches have been developed that look for phishing intentions by interacting with specific webpages to identify credential theft. One drawback associated with each of these conventional approaches however, is that they are all tuned to prioritize the detection of large-scale phishing attacks based on a generic user profile. Thus, phishing detection systems utilizing these approaches lack the ability to scale so that they cover every user or user environment.

SUMMARY

As will be described in greater detail below, the present disclosure describes various systems and methods for utilizing user profile data to protect against phishing attacks.

In one example, a method for utilizing user profile data to protect against phishing attacks may include (i) detecting, by one or more computing devices, a profile of a target user associated with one or more services accessed by a network-based application, (ii) determining, by the one or more computing devices, at least one of a group of identifiers associated with each of the services, (iii) extracting, by the one or more computing devices and for each of the identifiers, feature vectors describing exploitable screen elements in the network-based application associated with phishing attacks, (iv) updating, by the one or more computing devices and based on the feature vectors, a group of previously extracted feature vectors in a data repository storing additional profiles for other users associated with the services accessed by the network-based application, (v) predicting, by the one or more computing devices and utilizing a machine-learning model, phishing attack threats for the profile of the target user based on a similarity with the additional profiles, and (vi) performing, by the one or more computing devices, a security action that protects against the phishing attack threats.

In some examples, the target user profile may be detected by parsing a web browsing history to identify uniform resource locators (URLs) associated with web pages requesting authentication credentials from the target user for accessing the services. Additionally or alternatively, the target user profile may be detected by analyzing electronic messaging data associated with the target user to identify registration information, login information, and transaction information associated with accessing the services. Additionally or alternatively, the target user profile may be detected by retrieving social networking data associated with the target user to identify activities potentially associated with accessing the services.

In some embodiments, the identifiers associated with the services may be determined by (i) identifying URLs, domains, and/or subdomains for each of the services and (ii) selecting the URLs, domains, and/or subdomains associated with web pages requesting authentication credentials or personally identifiable information from the target user. In some examples, the feature vectors may be extracted by (i) identifying brand data, domain registration data, web page weighting data, and/or web page content data and (ii) extracting the brand data, domain registration data, web page weighting data, and/or web page content data as the feature vectors.

In some examples, the group of previously extracted feature vectors in the data repository may be updated by grouping the extracted feature vectors with the previously extracted feature vectors for the services accessed by the network-based application. In some embodiments, the phishing attack threats may be predicted by identifying additional services associated with the other users that are potentially accessible by the target user based on the similarity of the profile with the additional profiles. In some examples, the additional services may be identified by identifying at least one new service for the target user sharing a common category with the services accessed by the network-based application. Additionally or alternatively, the additional services may be identified by identifying at least one new service for the target user that is a competitor within a geographic region shared by the services accessed by the network-based application. Additionally or alternatively, the additional services may be identified by identifying new services for the target user that share a common owner with the services accessed by the network-based application.

In some examples, the security action may include (i) selecting a URL associated with the target user, (ii) comparing the URL to an allow list of services for the profile of the target user (iii) evaluating the URL against training data in the machine-learning model to determine whether the URL is associated with the phishing attack threats, and (iv) identifying the URL as a potential phishing attack based on a match with the phishing attack threats predicted by the machine-learning model.

In one embodiment, a system for utilizing user profile data to protect against phishing attacks may include at least one physical processor and physical memory that includes computer-executable instructions and a group of modules that, when executed by the physical processor, cause the physical processor to (i) detect, by a detection module, a profile of a target user associated with services accessed by a network-based application, (ii) determine, by a determining module, at least one of a group of identifiers associated with each of the services, (iii) extract, by an extraction module and for each of the identifiers, feature vectors describing exploitable screen elements in the network-based application associated with phishing attacks, (iv) update, by an update module and based on the feature vectors, a group of previously extracted feature vectors in a data repository storing additional profiles for other users associated with the services accessed by the network-based application, (v) predict, by a prediction module and utilizing a machine-learning model, phishing attack threats for the profile of the target user based on a similarity with the additional profiles, and (vi) perform, by a security module, a security action that protects against the phishing attack threats.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect a profile of a target user associated with services accessed by a network-based application, (ii) determine at least one of a group of identifiers associated with each of the services, (iii) extract feature vectors describing exploitable screen elements in the network-based application associated with phishing attacks, (iv) update, based on the feature vectors, a group of previously extracted feature vectors in a data repository storing additional profiles for other users associated with the services accessed by the network-based application, (v) predict, utilizing a machine-learning model, phishing attack threats for the profile of the target user based on a similarity with the additional profiles, and (iv) perform a security action that protects against the phishing attack threats.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
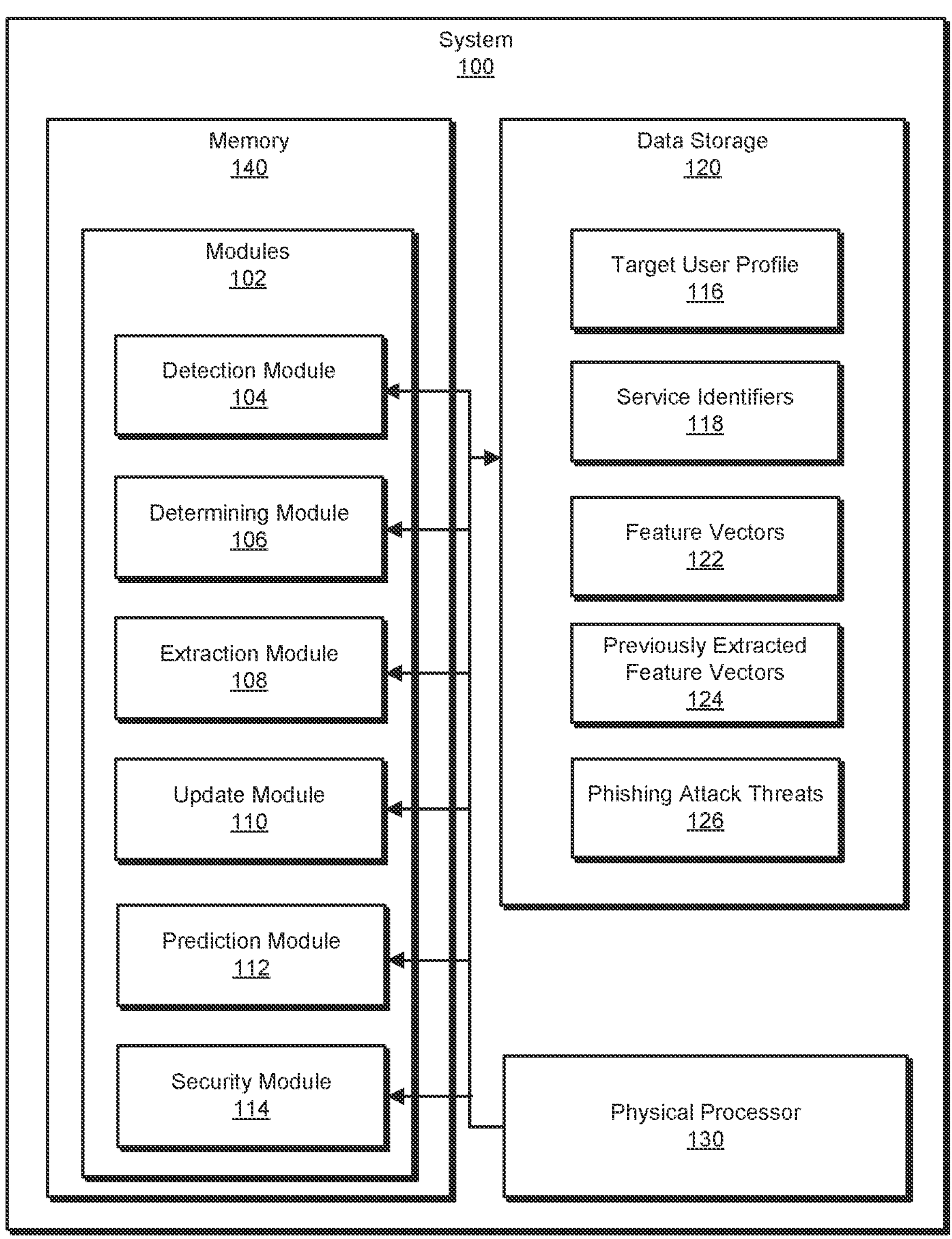
FIG. 1 is a block diagram of an example system for utilizing user profile data to protect against phishing attacks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for utilizing user profile data to protect against phishing attacks. As will be described in greater detail below, the systems and methods described herein may utilize user profile data (e.g., browsing history data, e-mail communications, social networking profile data, etc.) to tune the direction of phishing attack threats around a range of domains (e.g., domains associated with brands and services a user is likely familiar with) and further scale up phishing detection only towards each user's profile (i.e., to include additional brands and services a user may be likely to interact with based on similar profiles of other users) rather than needing to detect every single brand or service. By utilizing the user profile data in this way, the systems and methods described herein may personalize the detection of phishing attack threats, on a per user basis, based on brands and services a user is likely familiar with or may become familiar with in the future. In addition, the systems and methods described herein may improve the technical field of computing device security by detecting specific phishing attack threats based on a user's personalized brand and services portfolio and therefore overcoming the deficiencies of conventional approaches that are only tuned to prioritize the detection of large-scale phishing attacks based on a generic user profile.

Figure 2:
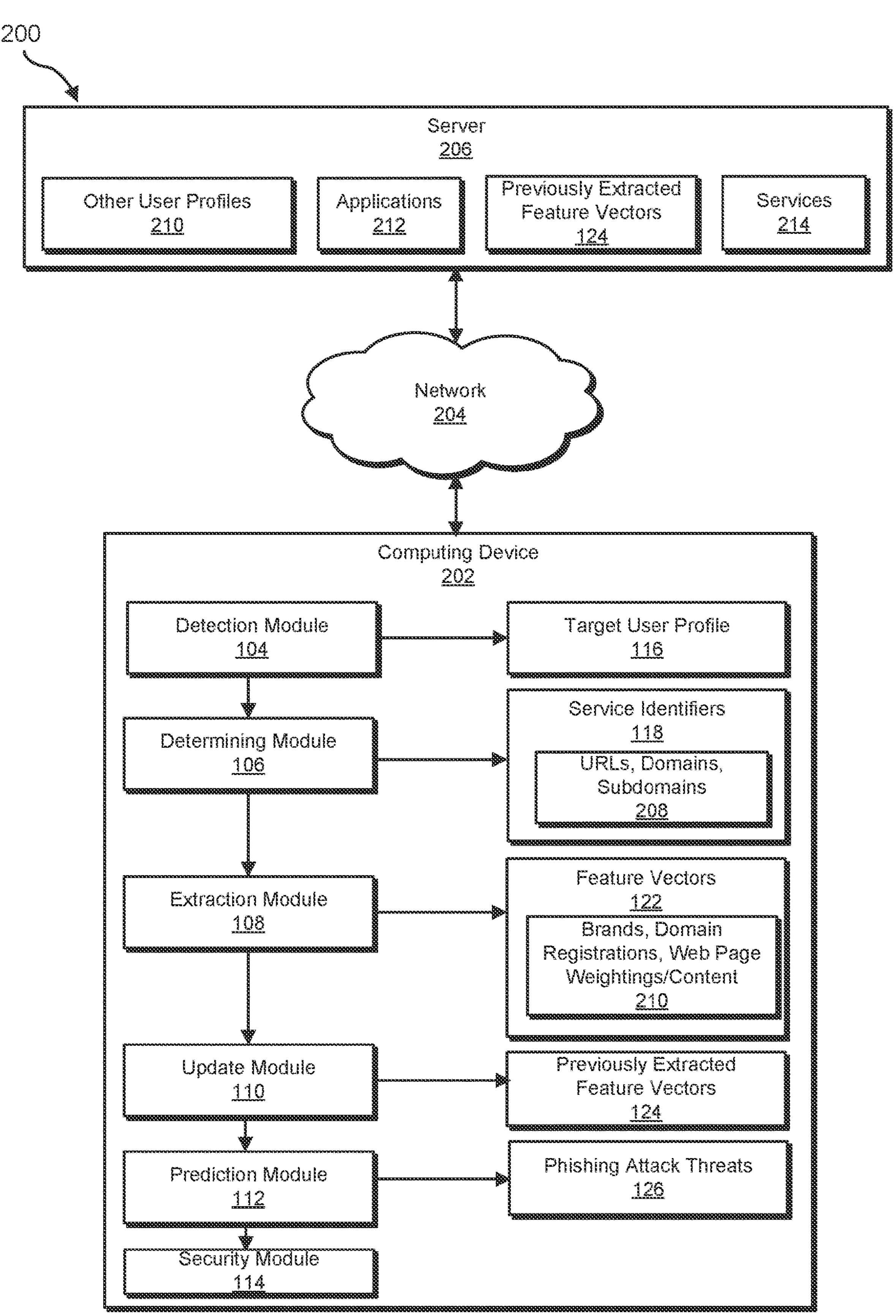
FIG. 2 is a block diagram of an additional example system for utilizing user profile data to protect against phishing attacks.

The following will provide, with reference to FIGS. 1-2, detailed descriptions of example systems for utilizing user profile data to protect against phishing attacks. Detailed descriptions of corresponding computer-implemented methods will also be provided in connection with FIGS. 3 and 5. In addition, a detailed description of machine-learning model that may be utilized in the example systems of FIGS. 1 and 2 will also be provided in connection with FIG. 4. In addition, detailed descriptions of an example computing system and network architecture capable of implementing one or more of the embodiments described herein will be provided in connection with FIGS. 6 and 7, respectively.

FIG. 1 is a block diagram of an example system 100 for utilizing user profile data to protect against phishing attacks. As illustrated in this figure, example system 100 may include one or more modules 102 for performing one or more tasks. For example, and as will be explained in greater detail below, example system 100 may include a detection module 104 that detects a target user profile 116 associated with one or more services accessed by a network-based application. Example system 100 may additionally include a determining module 106 that determines service identifiers 118 (e.g., URLs, domains, and/or subdomains) associated with each of the accessed services. Example system 100 may also include an extraction module 108 that extracts feature vectors 122 (e.g., brands, domain registrations, web page weightings and/or web page content) describing exploitable screen elements in the network-based application that may be associated with phishing attacks. Example system 100 may additionally include an update module 110 that updates, based on feature vectors 122, previously extracted feature vectors 124 in a data repository storing additional profiles for other users associated with the accessed services. Example system 100 may also include a prediction module 112 that predicts, utilizing a machine-learning model, phishing attack threats 126 for target user profile 116 based on a similarity with the additional profiles. Example system 100 may additionally include a security module 114 that performs a security action that protects against phishing attack threats 126. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate utilizing user profile data to protect against phishing attacks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store target user profile 116, service identifiers 118, feature vectors 122, previously extracted feature vectors 124, and phishing attack threats 126.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to utilize user profile data to protect against phishing attacks.

For example, detection module 104 may detect target user profile 116 associated with services 214 accessed by one or more applications 212. Next, determining module 106 may determine service identifiers 118 associated with each of services 214. In some examples, service identifiers 118 may include URLs, domains, and subdomains 208 associated with services 214. Then, extraction module 108 may extract feature vectors 122 describing exploitable screen elements in applications 212 associated with phishing attacks. In some examples, feature vectors 122 may include brands, domain registrations, and web page weightings/content 209. Next, update module 110 may update, based on feature vectors 122, previously extracted feature vectors 124 in a data repository (e.g., server 206) storing other user profiles 210 associated with services 214. Then, prediction module 112 may predict, utilizing a machine-learning model, phishing attack threats 126 for target user profile 116 based on a similarity with other user profiles 210. Finally, security module 114 may perform a security action that protects against phishing attack threats 126.

The term "phishing attack threats" as used herein, generally refers to a set of websites or networked-based applications associated with certain brands or services that, based on a user profile or the profiles of similar users (e.g., a range of domains or other data discovered from a browsing history, e-mail communications, social media network posts, etc.), the user is likely familiar with and presumably trusts, but which are also vulnerable to phishing. For example, a user may frequently access domains associated with a certain financial services institution website for performing banking transactions and thus would be vulnerable to a phishing attack. Similarly, a user may also be likely to access new domains associated with brands or services associated with similar users (e.g., competitor financial services institutions, other financial institutions in the same geographic area, popular financial services institutions, commonly owned financial services institutions etc.) and thus would also be vulnerable to phishing attacks with respect to these domains.

Computing device 202 generally represents any type or form of computing device capable of reading computer-executable instructions. In some examples, computing device 202 may represent an endpoint device running (e.g., as a browser extension), a threat protection service configured to detect malicious websites (e.g., phishing websites). Additional examples of mobile computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of capable of reading computer-executable instructions. In some examples, server 206 may be an application and storage server for providing online services and network-based applications as well as maintaining user data. Additional examples of server 206 include, without limitation, security servers, web servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
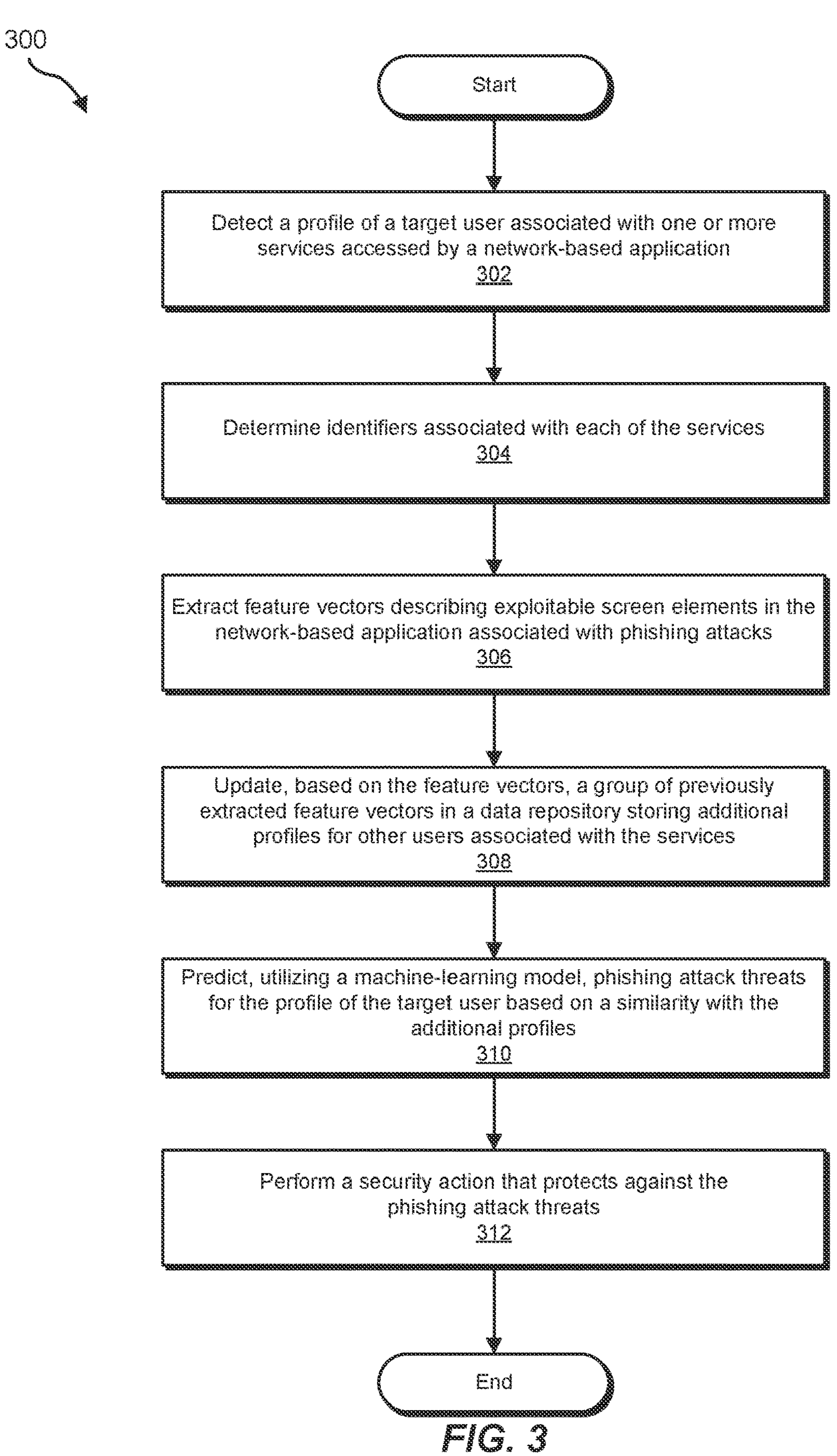
FIG. 3 is a flow diagram of an example method for utilizing user profile data to protect against phishing attacks.

FIG. 3 is a flow diagram of an example computer-implemented method 300 for utilizing user profile data to protect against phishing attacks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect a profile of a target user associated with one or more services accessed by a network-based application. For example, detection module 104 may, as part of computing device 202 in FIG. 2, detect target user profile 116 associated with services 214 accessed by applications 212. In some examples, applications 212 may include network-based applications such as a web browser or an Internet-connected mobile application configured to access various network services (e.g., a banking website).

The term "target user profile" as used herein, generally refers a group of brands and/or services (e.g., a portfolio) that are familiar and/or frequently utilized by a user of a networked-based application. For example, a target user profile for a user who often engages in making financial transactions over the Internet may include brand names associated with banking websites and or mobile applications, online payment services, etc.

Detection module 104 may detect target user profile 116 in a variety of ways. In some embodiments, detection module 104 may parse a user web browsing history to identify URLs associated with web pages requesting authentication credentials from the user for accessing services 214. Additionally or alternatively, detection module 104 may analyze electronic messaging data (e.g., e-mails) associated with the user to identify registration information, login information, and/or transaction information associated with accessing services 214. Additionally or alternatively, detection module 104 may retrieve social networking data associated with the user to identify activities (e.g., posts discussing financial services brands, websites, mobile applications, etc.) potentially associated with accessing services 214.

At step 304, one or more of the systems described herein may determine identifiers associated with each of the services. For example, determining module 106 may, as part of computing device 202 in FIG. 2, determine service identifiers 118 associated with services 214.

Determining module 106 may determine service identifiers 118 in a variety of ways. In some embodiments, determining module 106 may first identify (e.g., from services web pages) URLs, domains, and subdomains 208 (i.e., one or more of URLs, domains, and subdomains) for each of services 214. Then, determining module 106 may select relevant URLs, domains, and subdomains 208 associated with the web pages that request authentication credentials and/or personally identifiable information from the user (i.e., information that may be utilized in a phishing attack).

At step 306, one or more of the systems described herein may extract feature vectors describing exploitable screen elements in the network-based application associated with phishing attacks. For example, extraction module 108 may, as part of computing device 202 in FIG. 2, extract feature vectors 122 in applications 212.

The term "feature vectors" as used herein, generally refers to data associated with network domains and/or subdomains that may be associated with or potentially exploited for use in phishing attacks. For example, feature vectors may include web page content such as screen shots, brand logos, login forms and/or personally identifiable information input forms. Additionally, feature vectors may include domain registration data and/or web page weighting data (e.g., web page ranking data), Extraction module 108 may extract feature vectors 122 in a variety of ways. In some embodiments, extraction module 108 may identify brands, domain registrations, and web page weightings/content 209 and then extract this data as feature vectors 122. As discussed above, brands, domain registrations, and web page weightings/content 209 may include screen shots, brand logos, login forms and/or personally identifiable information input forms that may be exploited for use in phishing attacks against the user.

At step 308, one or more of the systems described herein may update, based on the feature vectors, a group of previously extracted feature vectors in a data repository storing additional profiles for other users associated with the services. For example, update module 110 may, as part of computing device 202 in FIG. 2, update, based on feature vectors 122, previously extracted feature vectors 124 (stored in server 206) for other user profiles 210 associated with services 214.

Update module 110 may update previously extracted feature vectors 124 in a in a variety of ways. In some embodiments, update module 110 may group feature vectors 122 with previously extracted feature vectors 124 for services 214 (i.e., common services) accessed by applications 212.

At step 310, one or more of the systems described herein may predict, utilizing a machine-learning model, phishing attack threats for the profile of the target user based on a similarity with the additional profiles. For example, prediction module 112 may, as part of computing device 202 in FIG. 2, predict phishing attack threats 126 for target user profile 116 based on a similarity with other user profiles 210.

Prediction module 112 may predict phishing attack threats 126 for target user profile 116 in a in a variety of ways. In some embodiments, prediction module 112 may identify additional services associated with users of other user profiles 210 that are potentially accessible by a user of target user profile 116 based on the similarity of target user profile with other user profiles 210. In some examples, the additional services may be identified by identifying at least one new service for target user profile 116 that shares a common category (e.g., online banking) with services 214. Additionally or alternatively, the additional services may be identified by identifying at least one new service for target user profile 116 that is a competitor within a geographic region shared by services 214. Additionally or alternatively, the additional services may be identified by identifying new services for target user profile 116 sharing a common owner (e.g., a common ownership entity) with services 214.

At step 312, one or more of the systems described herein may perform a security action that protects against the phishing attack threats. For example, security module 114 may, as part of computing device 202 in FIG. 2, perform a security action that protects against phishing attack threats 126.

Figure 4:
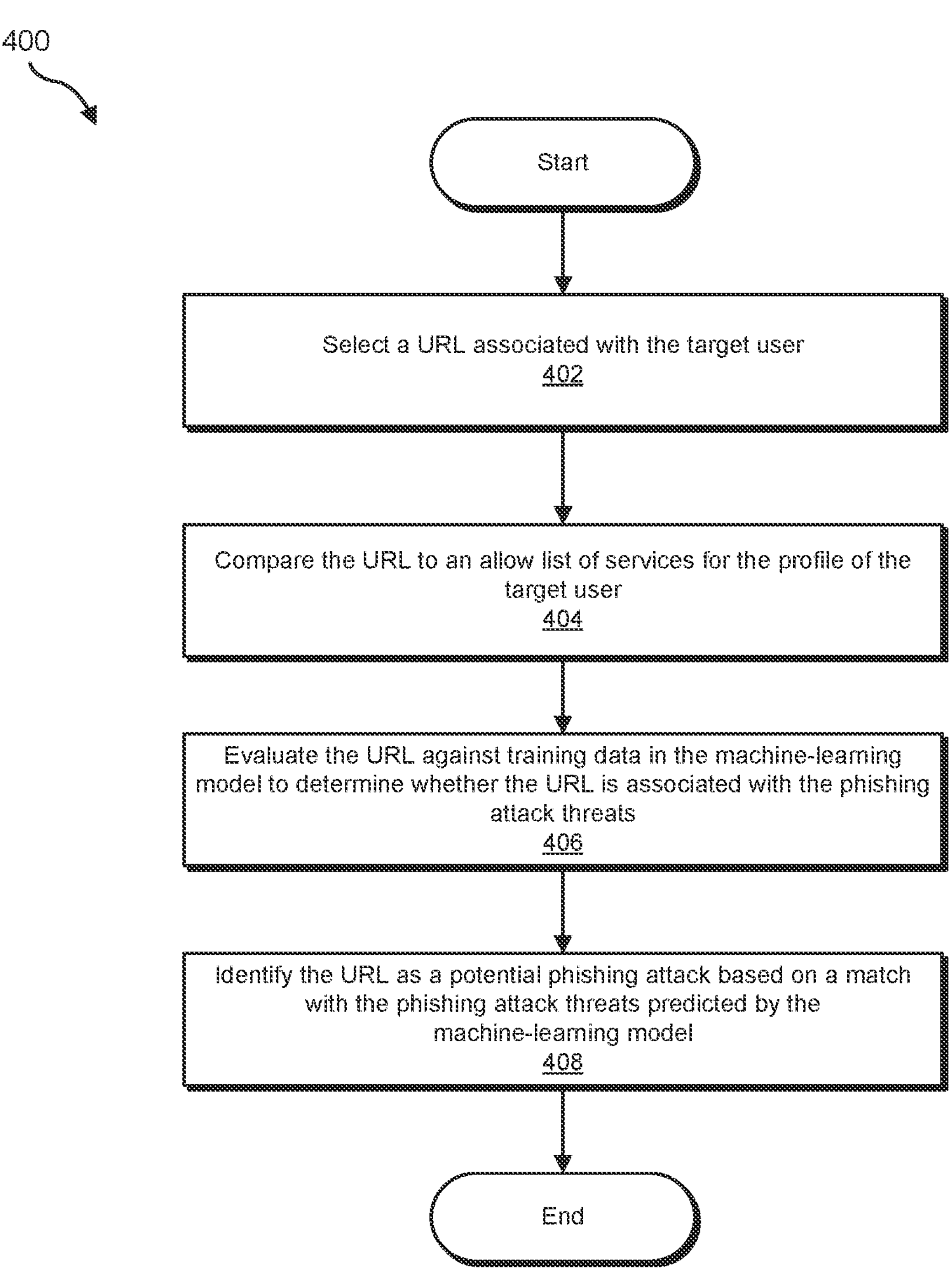
FIG. 4 is a block diagram of a machine-learning model that may be utilized in the example systems of FIGS. 1 and 2.
Figure 5:
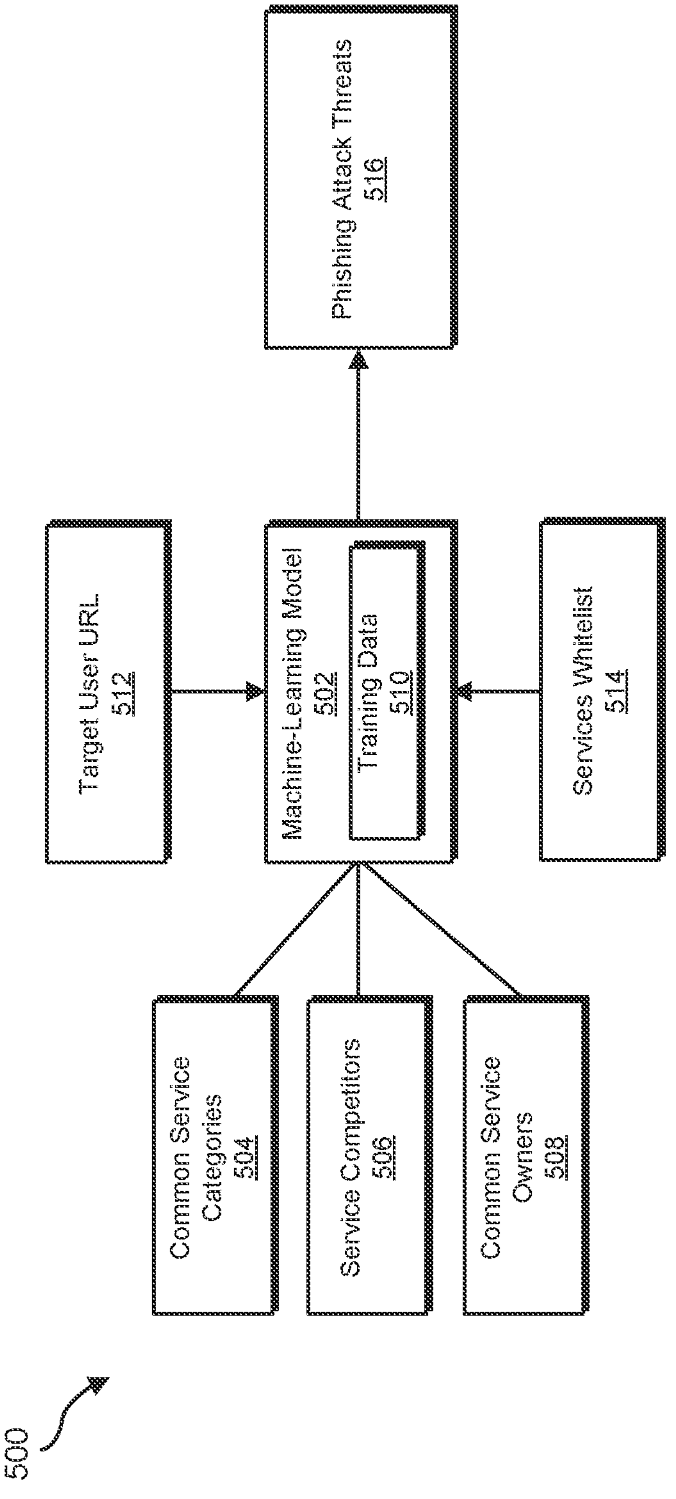
FIG. 5 is a flow diagram of another example method for utilizing user profile data to protect against phishing attacks.

Security module 114 may be utilized to protect against phishing attack threats 126 in a in a variety of ways as now will be described with respect to FIG. 4. Turning now to FIG. 4, a flow diagram of an example computer-implemented method 400 is provided for utilizing user profile data to protect against phishing attacks. The steps shown in FIG. 4 may be performed by any suitable computer-executable code and/or computing system, including system 100 in FIG. 1, system 200 in FIG. 2, system 500 in FIG. 5 and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may select a URL associated with a target user. For example, security module 114 may, as part of computing device 202 in FIG. 2, select a target user URL such as target user URL 512 shown in system 500 of FIG. 5.

At step 404 one or more of the systems described herein may compare the URL to an allow list (e.g., whitelist) of services for the profile of the target user. For example, and referring to system 500 in FIG. 5, security module 114 may, as part of computing device 202 in FIG. 2, compare target user URL 512 to services whitelist 514.

At step 406 one or more of the systems described herein may evaluate the URL against training data in the machine-learning model to determine whether the URL is associated with the phishing attack threats. For example, and referring to system 500 in FIG. 5, security module 114 may, as part of computing device 202 in FIG. 2, evaluate target user URL 512 against training data 510 in machine-learning model 502 to determine whether target user URL is associated with phishing attack threats 516. In some embodiments, training data 510 for machine-learning model 502 may include common service categories 504, service competitors 506, and common service owners 508.

At step 408 one or more of the systems described herein may identify the URL as a potential phishing attack based on a match with the phishing attack threats predicted by the machine-learning model. For example, and referring to system 500 in FIG. 5, security module 114 may, as part of computing device 202 in FIG. 2, identify target user URL 512 as a potential phishing attack based on a match with phishing attack threats 516 predicted utilizing machine-learning model 502 (as described above with respect to step 310 of FIG. 3.

As explained in connection with method 300 above, the systems and methods described herein provide for utilizing user profile data to protect against phishing attacks. The systems and methods described herein may utilize user profile data (e.g., browsing history data, e-mail communications, social networking profile data, etc.) to tune the direction of phishing attack threats around a range of domains associated with brands and services a user is likely familiar with and further scale up phishing detection only towards each user's profile (i.e., to include additional brands and services a user may be likely to interact with based on similar profiles of other users) rather than needing to detect every single brand or service. By utilizing the user profile data in this way, the systems and methods described herein may personalize the detection of phishing attack threats, on a per user basis, based on brands and services a user is likely familiar with or may become familiar with in the future.

Figure 6:
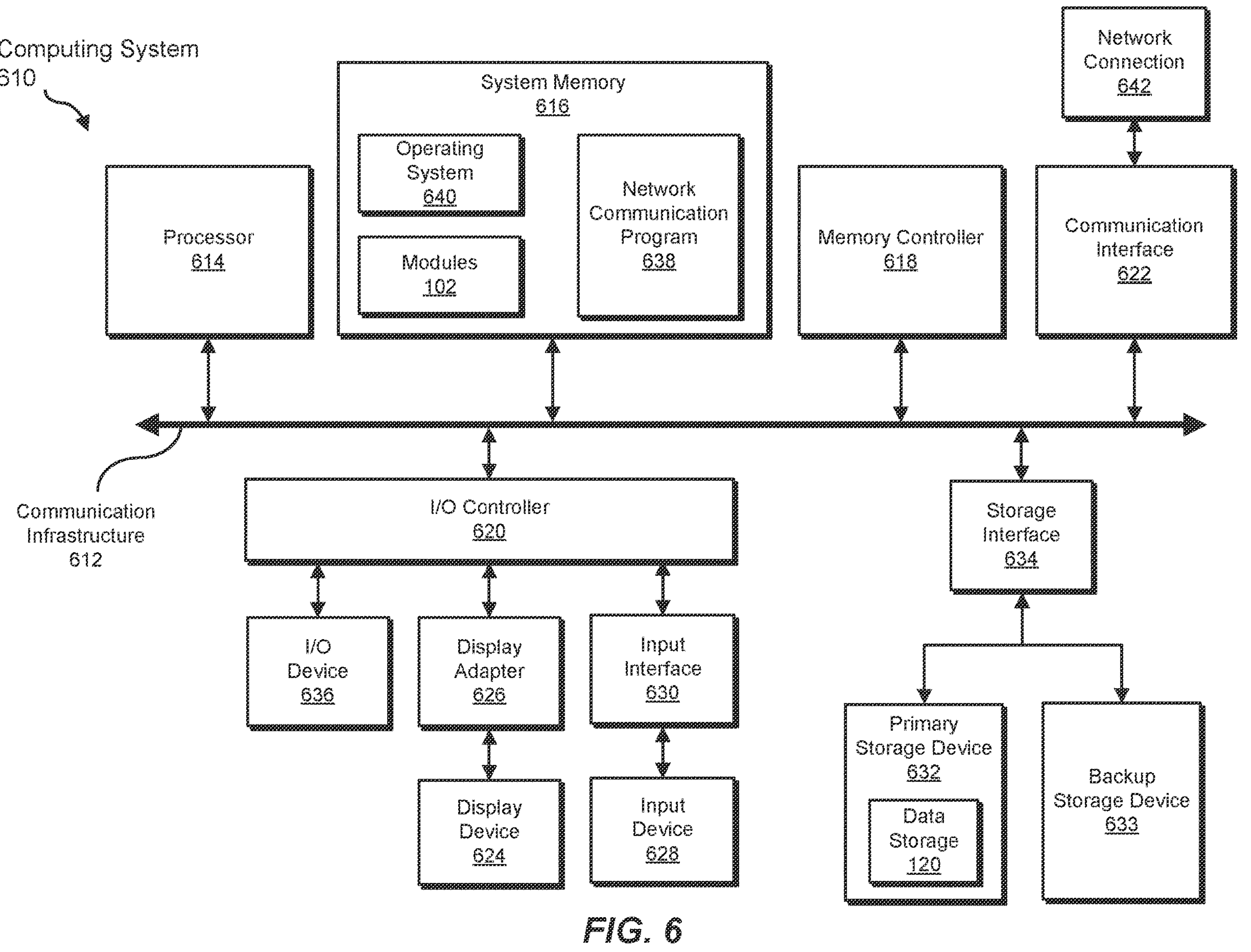
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
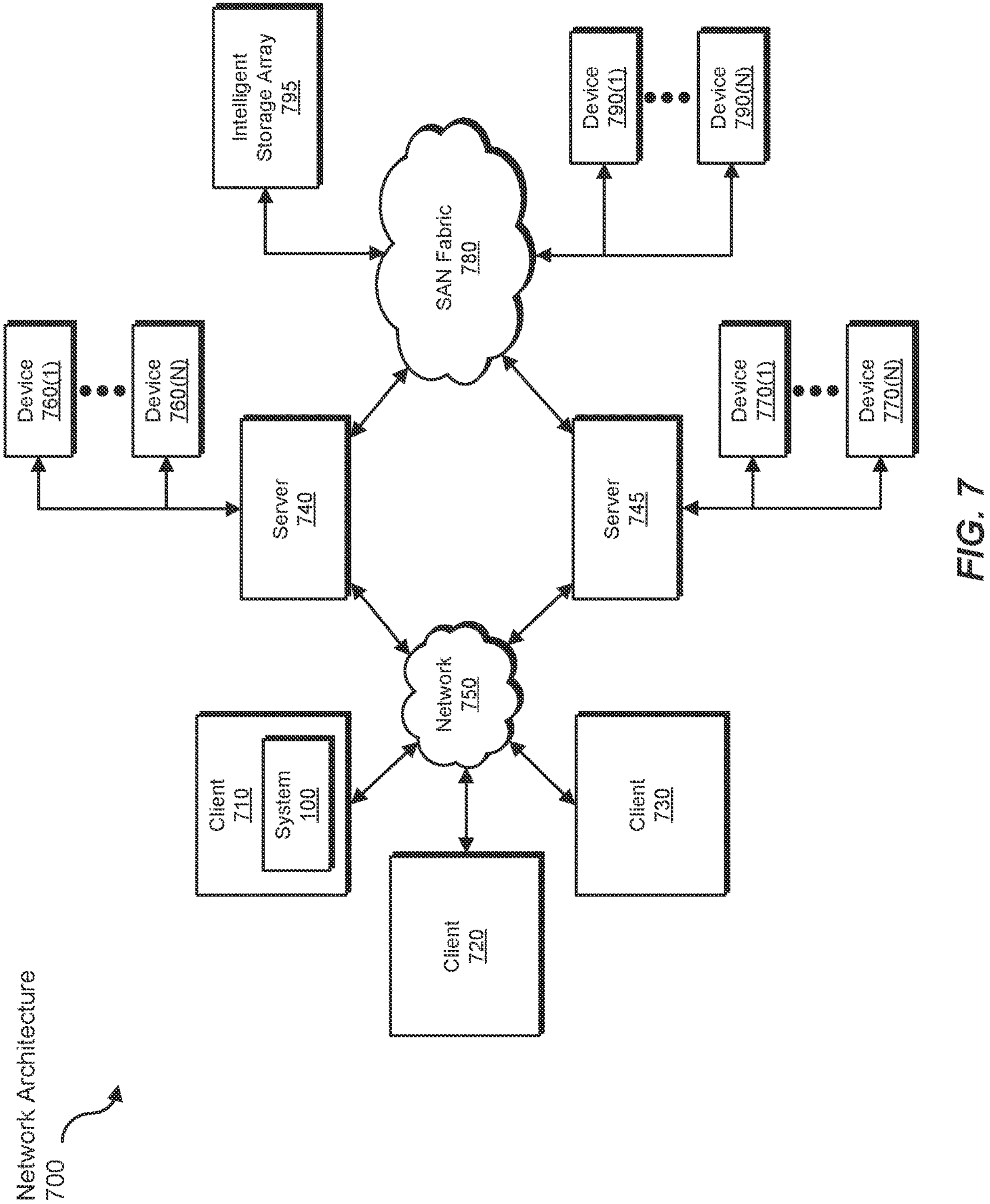
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for utilizing user profile data to protect against phishing attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for utilizing user profile data to protect against phishing attacks, at least a portion of the method being performed by a client-side computing device comprising at least one processor, the method comprising:

detecting, by the client-side computing device, a profile of a target user of a network-based application, wherein the profile of the target user is identified by one or more services accessed by the user using the network-based application;

determining, by the client-side computing device, at least one of a plurality of identifiers associated with each of the one or more services;

extracting, by the client-side computing device and for each of the identifiers, feature vectors describing exploitable screen elements in the network-based application associated with phishing attacks, wherein the feature vectors correspond to one or more of brand data, domain registration data, web page weighting data, and web page content data;

updating, by the client-side computing device and based on the feature vectors, a group of previously extracted feature vectors in a remote data repository, wherein the remote data repository stores additional profiles for other users identified by the services accessed by the other users using the network-based application;

receiving, by the client-side computing device from the remote data repository, at least one of the additional profiles that is identified as similar to the profile of the target user based on the updated group of feature vectors;

training, on the client-side computing device, a machine-learning model with feature vectors associated with the profile of the target user and the at least one of the additional profiles to restrict predictions to services that the target user is likely to interact with;

predicting, by the client-side computing device and utilizing the machine-learning model, phishing attack threats corresponding to the services that the target user is likely to interact with based on at least a similarity feature indicating a similarity between the profile of the target user and the at least one of the additional profiles; and performing, by the one or more computing devices, a security action that protects against the predicted phishing attack threats.

2. The computer-implemented method of claim 1, wherein detecting the profile of the target user comprises at least one of:

parsing a web browsing history to identify one or more uniform resource locators (URLs) associated with web pages requesting authentication credentials from the target user for accessing the services;

analyzing electronic messaging data associated with the target user to identify at least one of registration information, login information, and transaction information associated with accessing the services; or retrieving social networking data associated with the target user to identify activities potentially associated with accessing the services.

3. The computer-implemented method of claim 1, wherein determining the identifiers associated with each of the services comprises:

identifying at least one of URLs, domains, and subdomains for each of the one or more services; and selecting the at least one of URLs, domains, and subdomains associated with web pages requesting one or more of authentication credentials and personally identifiable information from the target user.

4. The computer-implemented method of claim 1, wherein extracting the feature vectors comprises:

Identifying the one or more of brand data, domain registration data, web page weighting data, and web page content data; and extracting the one or more of the brand data, domain registration data, web page weighting data, and web page content data as the feature vectors.

5. The computer-implemented method of claim 1, wherein updating the group of previously extracted feature vectors in the data repository comprises grouping the extracted feature vectors with the previously extracted feature vectors for the services accessed by the network-based application.

6. The computer-implemented method of claim 1, wherein predicting the phishing attack threats comprises identifying additional services associated with the other users that are potentially accessible by the target user based on the similarity of the profile of the target user with the additional profiles.

7. The computer-implemented method of claim 6, wherein identifying the additional services associated with the other users that are potentially accessible by the target user comprises identifying at least one new service for the target user sharing a common category with the services accessed by the network-based application.

8. The computer-implemented method of claim 6, wherein identifying the additional services associated with the other users that are potentially accessible by the target user comprises identifying at least one new service for the target user that is a competitor within a geographic region shared by the services accessed by the network-based application.

9. The computer-implemented method of claim 6, wherein identifying the additional services associated with the other users that are potentially accessible by the target user comprises identifying new services for the target user that share a common owner with the services accessed by the network-based application.

10. The computer-implemented method of claim 1, wherein performing the security action comprises:

selecting a URL associated with the target user;

comparing the URL to an allow list of services for the profile of the target user;

evaluating the URL against training data in the machine-learning model to determine whether the URL is associated with the phishing attack threats; and identifying the URL as a potential phishing attack based on a match with the phishing attack threats predicted by the machine-learning model.

11. A system for utilizing user profile data to protect against phishing attacks, the system comprising:

at least one physical processor; and physical memory comprising computer-executable instructions and one or more modules that, when executed by the physical processor, cause the physical processor to:

detect, by a detection module, a profile of a target user of a network-based application, wherein the profile of the target user is identified by one or more services accessed by the user using the network-based application;

determine, by a determining module, at least one of a plurality of identifiers associated with each of the one or more services;

extract, by an extraction module and for each of the identifiers, feature vectors describing exploitable screen elements in the network-based application associated with phishing attacks, wherein the feature vectors correspond to one or more of brand data, domain registration data, web page weighting data, and web page content data;

update, by an update module and based on the feature vectors, a group of previously extracted feature vectors in a remote data repository, wherein the remote data repository stores additional profiles for other users identified by the services accessed by the other users using the network-based application;

receive, by the update module, at least one of the additional profiles that is identified as similar to the profile of the target user based on the updated group of feature vectors;

train, by a prediction module, a machine-learning model with feature vectors associated with the profile of the target user and the at least one of the additional profiles to restrict predictions to services that the target user is likely to interact with;

predict, by the prediction module and utilizing the machine-learning model, phishing attack threats corresponding to the services that the target user is likely to interact with based on at least a similarity feature indicating a similarity between the profile of the target user and the at least one of the additional profiles; and perform, by a security module, a security action that protects against the predicted phishing attack threats.

12. The system of claim 11, wherein the detection module detects the profile of the target user by:

parsing a web browsing history to identify one or more uniform resource locators (URLs) associated with web pages requesting authentication credentials from the target user for accessing the services;

analyzing electronic messaging data associated with the target user to identify at least one of registration information, login information, and transaction information associated with accessing the services; or retrieving social networking data associated with the target user to identify activities potentially associated with accessing the services.

13. The system of claim 11, wherein the determining module determines the identifiers associated with each of the services by:

identifying at least one of URLs, domains, and subdomains for each of the one or more services; and selecting the at least one of URLs, domains, and subdomains associated with web pages requesting one or more of authentication credentials and personally identifiable information from the target user.

14. The system of claim 11, wherein the extraction module extracts the feature vectors by:

identifying one or more of brand data, domain registration data, web page weighting data, and web page content data; and extracting the one or more of the brand data, domain registration data, web page weighting data, and web page content data as the feature vectors.

15. The system of claim 11, wherein the update module updates the group of previously extracted feature vectors in the data repository by grouping the extracted feature vectors with the previously extracted feature vectors for the services accessed by the network-based application.

16. The system of claim 11, wherein the prediction module predicts the phishing attack threats by identifying additional services associated with the other users that are potentially accessible by the target user based on the similarity of the profile of the target user with the additional profiles.

17. The system of claim 16, wherein the additional services associated with the other users that are potentially accessible by the target user are identified by identifying at least one new service for the target user sharing a common category with the services accessed by the network-based application.

18. The system of claim 16, wherein the additional services associated with the other users that are potentially accessible by the target user are identified by identifying at least one new service for the target user that is a competitor within a geographic region shared by the services accessed by the network-based application.

19. The system of claim 11, wherein the security module performs the security action by:

selecting a URL associated with the target user;

comparing the URL to an allow list of services for the profile of the target user;

evaluating the URL against training data in the machine-learning model to determine whether the URL is associated with the phishing attack threats; and identifying the URL as a potential phishing attack based on a match with the phishing attack threats predicted by the machine-learning model.

20. A non-transitory computer-readable medium comprising one or more computer-executable instructions that, when executed by at least one processor of a computing device, cause the computing device to:

detect a profile of a target user of a network-based application, wherein the profile of the target user is identified by one or more services accessed by the user using the network-based application;

determine at least one of a plurality of identifiers associated with each of the one or more services;

extract feature vectors describing exploitable screen elements in the network-based application associated with phishing attacks, wherein the feature vectors correspond to one or more of brand data, domain registration data, web page weighting data, and web page content data;

update, based on the feature vectors, a group of previously extracted feature vectors in a remote data repository, wherein the remote data repository stores additional profiles for other users identified by the services accessed by the other users using the network-based application;

receive, from the remote data repository, at least one of the additional profiles that is identified as similar to the profile of the target user based on the updated group of feature vectors;

train a machine-learning model with feature vectors associated with the profile of the target user and the at least one of the additional profiles to restrict predictions to services that the target user is likely to interact with;

predict, utilizing the machine-learning model, phishing attack threats corresponding to the services that the target user is likely to interact with based on at least a similarity feature indicating a similarity between the profile of the target user and the at least one of the additional profiles; and perform a security action that protects against the predicted phishing attack threats.

* * * * *